(12) United States Patent
Lee

(10) Patent No.: US 6,866,965 B2
(45) Date of Patent: Mar. 15, 2005

(54) POLYMERIC ELECTROLYTE AND LITHIUM BATTERY EMPLOYING THE SAME

(75) Inventor: Jin-young Lee, Suwon (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 248 days.

(21) Appl. No.: 09/961,294

(22) Filed: Sep. 25, 2001

(65) Prior Publication Data

US 2002/0042001 A1 Apr. 11, 2002

(30) Foreign Application Priority Data

Sep. 29, 2000 (KR) ........................................ 2000-57340

(51) Int. Cl.$^7$ ................................................ H01M 6/18
(52) U.S. Cl. ........................ 429/314; 429/317; 429/322; 429/323; 429/338; 429/342; 429/249; 429/232; 429/233; 252/62.2; 524/589; 524/590
(58) Field of Search ................................. 429/314, 317, 429/322, 323, 338, 342, 249, 232, 233; 252/62.2; 524/589, 590

(56) References Cited

U.S. PATENT DOCUMENTS

| 4,065,587 | A | | 12/1977 | Ting | |
|---|---|---|---|---|---|
| 5,985,419 | A | * | 11/1999 | Schlueter et al. | ........ 428/195.1 |
| 6,077,897 | A | * | 6/2000 | Wen et al. | ................... 524/589 |
| 6,159,639 | A | * | 12/2000 | Wen et al. | ................... 429/309 |

FOREIGN PATENT DOCUMENTS

| JP | 56-95934 | 8/1981 |
|---|---|---|
| JP | 4-112460 | 4/1992 |

OTHER PUBLICATIONS

Le Nest et al. "Mechanism of Ionic Conduction in Polyether–Polyurethane Networks Containing Lithium Perchlorate"., Journal of Power Sources, 20, (1987), pp. 339–344.*
Kim et al. "Synthesis and Characterization of Polyether Urethane Acrylate–LiCF3SO3–based Polymer Electrolytes by UV–Curing in Lithium Batteries", Journal of Power Sources, 84, (1999), pp. 12–23.*

* cited by examiner

*Primary Examiner*—Laura Weiner
(74) *Attorney, Agent, or Firm*—Stein, McEwen & Bui LLP

(57) ABSTRACT

A polymeric electrolyte and a lithium battery lithium employing the same. The polymeric electrolyte includes a cross-linked polyether urethane prepared by reacting a pre-polymer having a polyethylene oxide backbone and terminated with NCO, with a cross-linking agent, organic solvent and lithium salt. Since the polymeric electrolyte is electrochemically stable, a lithium battery having improved reliability and safety can be obtained by employing the polymeric electrolyte.

11 Claims, 2 Drawing Sheets

POLYMERIC ELECTROLYTE AND LITHIUM BATTERY EMPLOYING THE SAME

CROSS REFERENCE TO RELATED APPLICATIONS

This application is based on Korean Patent Application No. 00-57340 filed on Sep. 29, 2000 in the Korean Industrial Property Office, the contents of which is incorporated hereinto by reference.

BACKGROUND OF THE INVENTION

1. Field of the Invention

The present invention relates to a lithium battery, and more particularly, to an electrochemically stable polymeric electrolyte and a lithium battery using the same.

2. Description of the Related Art

Lithium secondary batteries generate electricity by lithium ions migrating between a cathode and an anode. The lithium secondary battery batteries have higher energy density per volume and have a higher voltage, than lithium cadmium batteries or nickel hydrogen batteries. Also, the lithium secondary batteries are lightweight compared to lithium cadmium batteries or nickel hydrogen batteries, that is, approximately a half. Thus, the lithium secondary batteries are well adapted for miniaturization and long-time use of electronic appliances.

As described above, since the lithium secondary batteries have higher voltage characteristics and a better charging/discharge cycle life than conventional nickel cadmium batteries or nickel hydrogen batteries, without causing environmental problems, much attention has been paid thereto as the most promising high-performance batteries. However, it is a critical issue to attain safety due to danger of explosion of a lithium secondary battery.

In order to secure the safety of a lithium secondary battery, it is important to attain the electrochemical stability of a material used as an electrolyte. In other words, in order to obtain a safe lithium secondary battery, it is very important to employ an electrolyte free of the danger of being dissolved at 2.75 to 4.3 V.

SUMMARY OF THE INVENTION

To solve the above problems, it is a first object of the present invention to provide a new polymeric electrolyte which is electrochemically stable.

It is a second object of the present invention to provide a method of preparing the polymeric electrolyte.

It is a third object of the present invention to provide a lithium battery having improved safety by employing the polymeric electrolyte.

It is a fourth object of the present invention to provide a method of manufacturing the lithium battery.

Additional objects and advantages of the invention will be set forth in part in the description which follows and, in part, will be obvious from the description, or may be learned by practice of the invention.

To achieve the above and other objects of the present invention a cross-linked polyether urethane polymeric electrolyte prepared by reacting a pre-polymer having a polyethylene oxide backbone and terminated with NCO, a cross-linking agent, an organic solvent and a lithium salt.

The above and other objects of the present invention are further achieved by providing a method of preparing a cross-linked polyether urethane polymeric electrolyte including mixing a pre-polymer having a polyethylene oxide backbone and terminated with NCO, with a cross-linking agent, an organic solvent and a lithium salt, and cross-linking the mixture.

The above and other objects of the present invention are still further achieved by providing a lithium battery including a cathode, an anode and a cross-linked polyether urethane polymeric electrolyte interposed between the cathode and the anode, and prepared by reacting a pre-polymer having a polyethylene oxide backbone and terminated with NCO, a cross-linking agent, an organic solvent and a lithium salt.

A separator which has a network structure and is made of an insulating resin, may be further provided between the cathode and the anode.

The above and other objects of the present invention are still yet further achieved by providing a method of manufacturing a lithium battery including mixing a pre-polymer having a polyethylene oxide backbone and terminated with NCO, with a cross-linking agent, an organic solvent and a lithium salt, casting the mixture on at least one selected surface of the cathode and the anode, and cross-linking the resultant product.

Alternatively, the above and other objects of the present invention may be achieved by providing a method of manufacturing a lithium battery including mixing a pre-polymer having a polyethylene oxide backbone and terminated with NCO, with a cross-linking agent, an organic solvent and a lithium salt, interposing a separator between a cathode and an anode to form an electrode assembly and accommodating the electrode assembly into a battery case, and injecting the mixture into the battery case and cross-linking the resultant product.

In the polymeric electrolyte and lithium battery, the pre-polymer used in the preparation of the cross-linked polyether urethane, is obtained by reacting isocyanate with glycol selected from polyethylene glycol, polypropylene glycol and a combination thereof. Here, the isocyanate is preferably at least one selected from the group consisting of tolylene 2,4-diisocyanate, tolylene 2,6-diisocyanate, diphenylmethane 4,4'-diisocyanate, hexamethylene diisocyanate, diphenylmethane diisocyanate, isophoprone diisocyanate, triphenylmethane diisocyanate, tris-(isocyanatephenyl) thiophosphate, lysine ester triisocyanate, 1,8-diisocyanate-4-isocyanatemethylocartane, undecane 1,6,11-triisocynate, hexamethylene 1,3,6-trisisocyanate and bicycloheptane triisocyanate.

The cross-linking agent used in the present invention is preferably at least one selected from the group consisting of glycerol ethoxylate, glycerol propoxylate, 3-methyl-1,3,5-pentanetriol and caprolactone.

In the method of manufacturing the polymeric electrolyte and lithium battery, the temperature of cross-linkage is preferably in the range from 25 to 65° C.

In the polymeric electrolyte and lithium battery according to the present invention, the lithium salt is preferably at least one selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$). Also, the organic solvent is preferably at least one solvent selected from the group consisting of propylene carbonate, ethylene carbonate, dimethyl carbonate, methylethyl carbonate, diethyl carbonate and vinylene carbonate.

In the lithium battery according to the present invention, the electrode assembly is preferably a winding type and the battery case is preferably a pouch.

In the lithium battery according to the present invention, the weight of a mixture of the organic solvent and lithium salt is preferably 3 to 30 times that of the pre-polymer. In particular, in the case where a separator is included in the electrode assembly, the weight of a mixture of the organic solvent and lithium salt is preferably 5 to 30 times that of the pre-polymer. Also, in the case where a separator is not included in the electrode assembly, the weight of a mixture of the organic solvent and lithium salt is preferably 3 to 15 times that of the pre-polymer.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
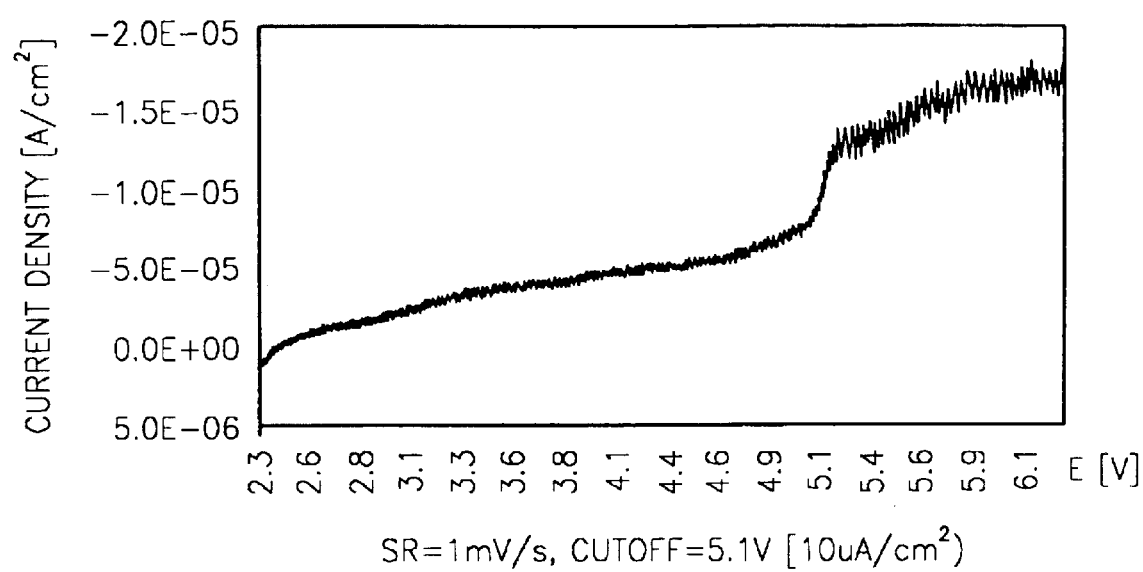
FIG. 1 shows a linear sweeping voltammogram for measuring the electrochemical stability of a polymeric electrolyte prepared according to the present invention, in which SR standing for scan rate means a voltage added rate.

Reference will now made in detail to the present preferred embodiments of the present invention, examples of which are illustrated in the accompanying drawings. The embodiments are described below in order to explain the present invention by referring to the figures.

A feature of the present invention lies in the fact that a cross-linked polyether urethane polymeric electrolyte prepared by reacting a pre-polymer having a polyethylene oxide backbone and terminated with NCO, with a cross-linking agent, an organic solvent and a lithium salt, is used as a polymeric electrolyte. A polyether urethane polymeric electrolyte prepared by adding the pre-polymer to a mixture of a cross-linking agent, an organic solvent and a lithium salt, injecting the same into a case accommodating an electrode assembly and cross-linking the resultant product, is preferred.

The pre-polymer is obtained by reacting isocyanate with glycol selected from the group consisting of polyethylene glycol, polypropylene glycol and a combination thereof.

According to a known journal describing the measurement result of the electrochemical stability of a polyurethane-based compound synthesized to be used as an electrolyte of a lithium battery, the dissolution potential of a urethane-based electrolyte is approximately 4.2 V (vs. lithium), which is difficult to be used in a lithium secondary battery (*Journal of Power Sources* 84(1999) pp.12–23). However, the present invention has been completed by improving the electrochemical stability of a polyurethane electrolyte.

A method of preparing a cross-linked polyether urethane polymeric electrolyte according to the present invention will now be described.

A one-shot process and a pre-polymer process are generally used in preparing a urethane bond. In the present invention, the urethane bond was formed by using the pre-polymer process.

The process of preparing a polyether urethane polymeric electrolyte according to the present invention will now be described. First, a pre-polymer having a polyethylene oxide backbone and constructed with NCO termination, is prepared by reacting a glycol selected from polyethylene glycol, polypropylene glycol and a combination thereof, with isocyanate.

The isocyanate is preferably at least one selected from the group consisting of tolylene 2,4-diisocyanate, tolylene 2,6-diisocyanate, diphenylmethane 4,4'-diisocyanate, hexamethylene diisocyanate, diphenylmethane diisocyanate, isophorone diisocyanate, triphenylmethane diisocyanate, tris-(isocyanatephenyl) thiophosphate, lysine ester triisocyanate, 1,8-diisocyanate-4-isocyanatemethyloctane, undecane 1,6,11-triisocynate, hexamethylene 1,3,6-trisisocyanate and bicycloheptane triisocyanate.

Then, the pre-polymer is added to a mixture of a cross-linking agent, an organic solvent and a lithium salt and reacted to prepare a polymeric electrolyte according to the present invention.

The cross-linking agent is preferably glycerol ethoxylate or glycerol propoxylate.

Also, the organic solvent and the lithium salt are not restricted to a special organic solvent and lithium salt, but to any organic solvent and lithium salt that are widely known in the art. Preferably, the lithium salt is at least one selected from the group consisting of $LiClO_4$, $LiBF_4$, $LiPF_6$, $LiCF_3SO_3$, $LiN(CF_3SO_2)_2$. The organic solvent is preferably at least one selected from the group consisting of propylene carbonate, ethylene carbonate, dimethyl carbonate, methylethyl carbonate, diethel carbonate and vinylene carbonate. Also, the weight of a mixture of the organic solvent and lithium salt is preferably 3 to 30 times that of the pre-polymer. The concentration of the lithium salt in the mixture is preferably 0.5 to 2 M.

In order to facilitate cross-linkage, it is preferred that a catalyst such as dibutyltin dilaurate is further added to a composition for the polymeric electrolyte. The temperature for cross-linkage is preferably in the range from 25 to 65° C.

A method of preparing a lithium battery containing the polymeric electrolyte according to the present invention will now be described.

First, an electrode active material layer is formed on a current collector using an electrode active material composition comprising an electrode active material, a binder, a conductive agent and a solvent. Here, the electrode active material layer may be formed such that the electrode active material composition is directly coated on the current collector or the electrode active material composition is coated on a separate support body and dried and then a film peeled off from the support body is laminated on the current collector. Here, as the support body, any material that can support the active material layer may be used, and detailed examples thereof include a mylar film and a polyethylene terephthalate (PET) film.

In the present invention, a lithium composite oxide such as $LiCoO2$ may be used as the electrode active material for a cathode and carbon or graphite may be used as the electrode active material for an anode. As the conductive agent, carbon black or the like can be used. Here, the content of the conductive agent is preferably 1 to 20 parts by weight based on 100 parts by weight of the electrode active material, e.g., $LiCoO_2$.

As the binder, vinylidenefluoride-hexafluoropropylene (VdF/HFP) copolymer, polyvinylidenefluoride, polyacrylonitrile, polymethylmethacrylate and mixtures thereof may be used, and the content thereof is preferably 5 to 30 parts by weight based on 100 parts by weight of the electrode active material.

All solvents for use in the conventional lithium battery can be used as the solvent, and detailed examples thereof include acetone and N-methylpyrrolidone.

In some cases, in order to improve the performance of a battery, $Li_2CO_3$ may be further added to the electrode active material composition.

The separator of the present invention is not specifically limited and usable separators include an easily windable polyethylene separator and polypropylenelpolyethylene/polypropylene three-layered separator. Also, since the polymeric electrolyte prepared according to the present invention serves as a separator, it is not necessary to use a separate separator.

A separator is interposed between the cathode and anode plates prepared in the above-described manner, and wound by a jelly-roll method to form an electrode assembly or a bi-cell electrode assembly. Subsequently, the electrode assembly is put into a case. Next, the thus formed pre-polymer having a polyethylene backbone and terminated with NCO is added to a mixture having a cross-linking agent, a lithium salt and an organic solvent, and then the resultant material is injected into the case.

Thereafter, the case is hermetically sealed and then the resultant product is allowed to stand in an oven maintained at a predetermined temperature for a predetermined time. Here, the oven is preferably maintained at a temperature in the range from 25 to 65° C. If the temperature of the oven exceeds 65° C., the electrolytic solution is decomposed to be undesirably discolored.

Then, as a result of the reaction, thermal polymerization occurs to the pre-polymer to generate a cross-linked product, thereby gelling the electrolytic solution. If the electrolytic solution exists in a gel type, it is unlikely to be leaked outside, thereby preventing lowering of the stability and reliability of the battery due to leak age of electrolytic solution.

Alternatively, in the case of not using a separate separator, the thus formed pre-polymer having a polyethylene backbone and terminated with NCO is added to a mixture having a cross-linking agent, a lithium salt and an organic solvent, and then the resultant product is cast on a cathode plate, an anode plate or both plates, and then thermally polymerized in an oven, thereby fabricating the lithium battery according to the present invention.

The lithium battery according to the present invention is not specifically limited in terms of type, and includes both a lithium primary battery and a lithium secondary battery.

The present invention will now be described through the following examples and is not limited thereto.

EXAMPLE 1

4 g of polyethyleneglycol having a molecular weight of 400 and 4.205 g of hexamethylene diisocyanyate were reacted at 65° C. to prepare a pre-polymer having a polyethyleneoxide backbone and terminated with NCO. Here, as a catalyst, 0.092 g (approximately 1 wt %) of dibutyltin dilaurate was used.

Subsequently, 0.085 g of the pre-polymer was mixed with 0.077 g of glycerol ethoxylate as a cross-linking agent, 2.92 g of a mixed solution containing 1.3 M $LiPF_6$ and ethylene carbonate/propylene carbonate/diethyl carbonate in the mixture ratio of 41:49:10, and 0.0235 g of dibutyl dilaurate. 3 g of the mixture was put into a pouch having a windable jelly roll, sealed, and then allowed to stand for 2 days. Then, the resultant product was thermally cross-linked at 65° C. for 4 hours to prepare a polymeric electrolyte.

Figure 2:
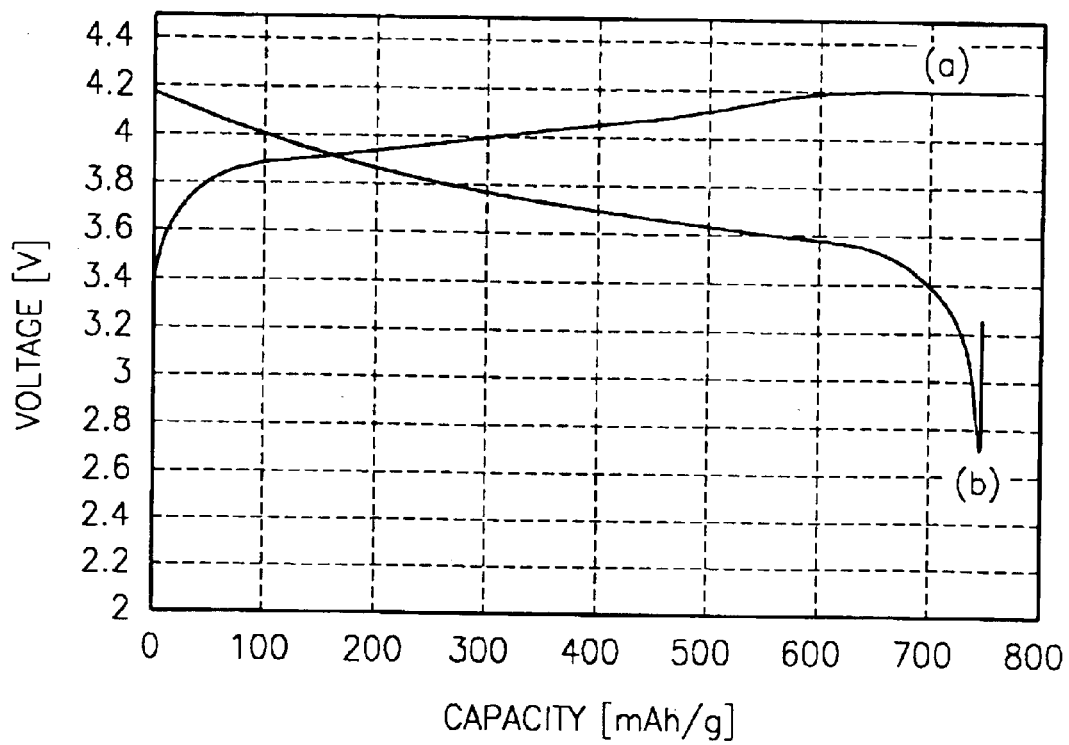
FIG. 2 shows a standard charging/discharging curve of a lithium secondary battery containing the polymeric electrolyte prepared according to an embodiment of the present invention.

The standard charging/discharging data (0.5C charging, 0.2C discharging) of the lithium secondary battery (nominal capacity: 800 mAh) prepared by employing the thus formed polymeric electrolyte, is shown in FIG. 2. In FIG. 2, (a) denotes a standard charging curve of a lithium secondary battery and (b) denotes a standard charging curve of a lithium battery.

EXAMPLE 2

A pre-polymer for forming polyether urethane polymer was prepared in the same manner as in Example 1.

Subsequently, 0.1 g of the pre-polymer was mixed with 0.091 g of glycerol ethoxylate as a cross-linking agent and 2.28 g of a mixed solution containing 1.3 M LiPF6 and ethylene carbonate/propylene carbonate/diethyl carbonate in the mixture ratio of 41:49:10. The mixture was allowed to stand at 25° C. for 12 hours to prepare a polymeric electrolyte.

Figure 3:
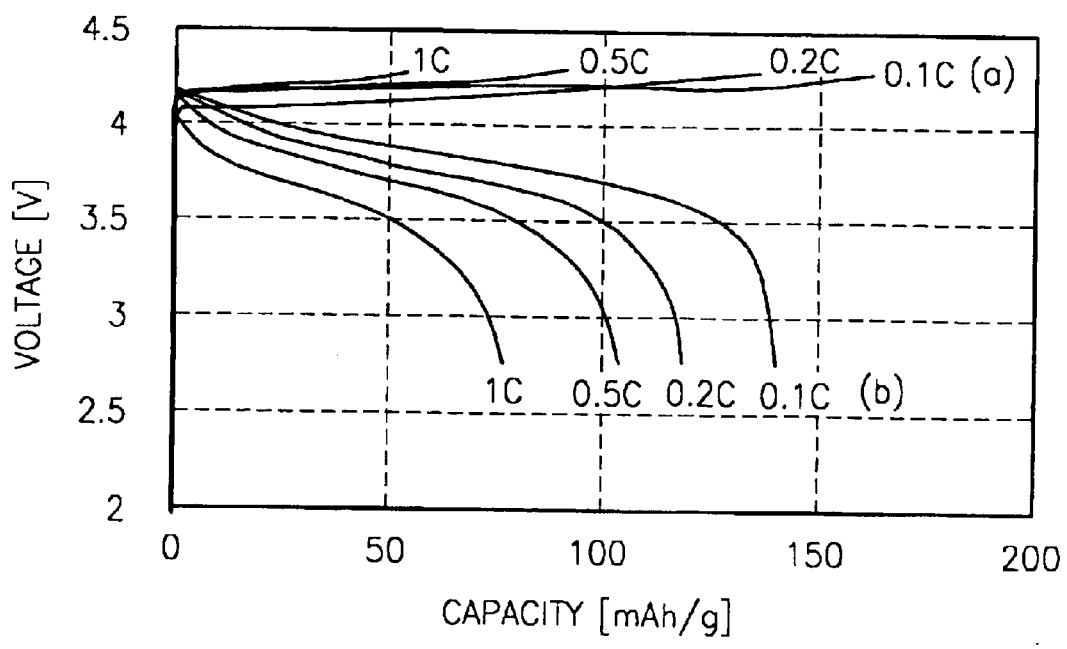
FIG. 3 shows a rated charging/discharging curve of a lithium secondary battery containing the polymeric electrolyte prepared according to an embodiment of the present invention.

The polymeric electrolyte was interposed between an anode (Li) and a cathode ($LiCoO_2$) to prepare a coin cell. The charging/discharging characteristics of the coin cell were measured by rate at 2.75 to 4.3 V and the result is shown in FIG. 3. In FIG. 3, (a) denotes a rated charging curve of a lithium secondary battery and (b) denotes a rated discharging curve of a lithium battery.

Experimental Example 1

This experiment is to measure the electrochemical stability of polyether urethane polymeric electrolyte prepared in Examples 1 and 2.

The dissolution potential of the polyether urethane polymeric electrolyte prepared in Example 1 was measured using a lithium electrode and a stainless (sus) electrode and the result is shown in FIG. 1.

FIG. 1 shows a linear sweeping voltammogram for measuring the electrochemical stability of a polymeric electrolyte prepared according to the present invention. FIG. 1 showed that the polyether urethane polymeric electrolyte according to the present invention was electrochemically stable even at 5.0 V or higher.

Thus, the polymeric electrolyte according to the present invention is suitably used for a lithium secondary battery in which a polymeric electrolyte free of danger of being dissolved at 2.75 to 4.3 V must be used.

Since the lithium secondary battery according to the present invention employs an electrochemically stable polyether urethane polymeric electrolyte, the reliability and safety of the lithium secondary battery can be improved.

Although the present invention has been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. A method of preparing a cross-linked polyether polymeric electrolyte comprising:

mixing a pre-polymer having a polyethylene oxide backbone and terminated with NCO, with a cross-linking agent selected from the group consisting of glycerol ethoxylate and glycerol propoxylate, an organic solvent and a lithium salt, to obtain a mixture and cross-linking the mixture to obtain a concentration of the lithium salt in the cross-linked polyether electrolyte of approximately 0.5 to 2.0 M.

2. The method according to claim 1, wherein the cross-linking comprises heating the mixture at a temperature in a range from 25 to 650° C.

3. A lithium battery comprising:

a cathode;

an anode; a cross-linked polyether urethane polymeric electrolyte interposed between the cathode and the anode, and prepared by reacting a pre-polymer having a polyethylene oxide backbone and terminated with NCO, a cross-linking agent, an organic solvent and a lithium salt; and a separator having a network structure and made of an insulating resin, between the cathode and the anode.

4. The lithium battery according to claim 3, wherein the cross-linking agent is at least one selected from the group consisting of glycerol ethoxylate, glycerol propoxylate, 3-methyl-1,3,5-pentanetriol and caprolactone.

5. The lithium battery according to claim 3, wherein the isocyanate is at least one selected from the group consisting of tolylene 2,4-diisocyanate, tolylene 2,6-diisocyanate, diphenylmethane 4,4'-diisocyanate, hexamethylene diisocyanate, diphenylmethane diisocyanate, isophoprone diisocyanate, triphenylmethane diisocyanate, tris-(isocyanatephenyl) thiophosphate, lysine ester triisocyanate, 1,8-diisocyanate-4-isocyanatemethylocartane, undecane 1,6,11-triisocynate, hexamethylene 1,3,6-trisisocyanate and bicycloheptane triisocyanate.

6. The lithium battery according to claim 3, wherein the lithium salt is at least one selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonyl amide ($LiN(CF_3SO_2)_2$).

7. The lithium battery according to claim 3, wherein the organic solvent is at least one solvent selected from the group consisting of propylene carbonate, ethylene carbonate, dimethyl carbonate, methylethyl carbonate, diethyl carbonate and vinylene carbonate.

8. The lithium battery according to claim 3, wherein the total weight of the organic solvent and lithium salt is 3 to 30 times that of the pre-polymer.

9. The lithium battery according to claim 8, wherein a concentration of the lithium salt in the cross-linked polyether urethane is 0.5 to 2 M.

10. The lithium battery according to claim 3, wherein the separator is formed of one selected from the group consisting of polypropylene, polyethylene and a combination thereof.

11. The lithium battery according to claim 3, wherein the cathode or the anode comprises:

a current collector, an electrode active material layer formed on the current collector, the electrode active material layer comprising:

an electrode active material, a binder, a conductive agent, and a solvent.

* * * * *